(12) United States Patent
Halberstadt et al.

(10) Patent No.: US 10,776,740 B2
(45) Date of Patent: *Sep. 15, 2020

(54) DETECTING POTENTIAL ROOT CAUSES OF DATA QUALITY ISSUES USING DATA LINEAGE GRAPHS

(71) Applicant: INTERNATIONAL BUSINESS MACHINES CORPORATION, Armonk, NY (US)

(72) Inventors: Benjamin Halberstadt, Jerusalem (IL); Roger K. Hecker, Efrat (IL); Ortal Nizri, Jerusalem (IL); Shlomo Steinhart, Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 15/175,084

(22) Filed: Jun. 7, 2016

(65) Prior Publication Data

US 2017/0351991 A1    Dec. 7, 2017

(51) Int. Cl.
| | | |
|---|---|---|
| *G06Q 10/00* | (2012.01) | |
| *G06Q 10/06* | (2012.01) | |
| *G06Q 30/06* | (2012.01) | |
| *G06F 16/25* | (2019.01) | |
| *G06F 16/23* | (2019.01) | |

(52) U.S. Cl.
CPC ... *G06Q 10/06395* (2013.01); *G06F 16/2365* (2019.01); *G06F 16/254* (2019.01); *G06Q 30/0635* (2013.01)

(58) Field of Classification Search
CPC .......... G06Q 10/06395; G06Q 30/0635; G06F 16/254; G06F 16/2365
See application file for complete search history.

(56) References Cited

U.S. PATENT DOCUMENTS

| | | | |
|---|---|---|---|
| 7,840,603 B2 * | 11/2010 | Huang | G06F 17/30377 707/802 |
| 7,865,461 B1 | 1/2011 | Best | |
| 7,865,507 B2 | 1/2011 | Namait et al. | |
| 8,166,048 B2 | 4/2012 | Wong et al. | |
| 9,053,437 B2 | 6/2015 | Alder et al. | |
| 9,098,803 B1 * | 8/2015 | Todd | G06N 5/02 |

(Continued)

OTHER PUBLICATIONS

"Profiler: Integrated statistical analysis and visualization for data quality assessment", S Kandel, R Parikh, A Paepcke, JM Hellerstein . . .—Proceedings of the . . . , 2012—dl.acm.org.*

(Continued)

*Primary Examiner* — Jonathan G Sterrett
(74) *Attorney, Agent, or Firm* — John Noh

(57) ABSTRACT

An example system includes a processor that can generate a first lineage graph based on a first set of monitored assets and processes used to produce a data asset. The processor can detect a data quality issue at the data asset. The processor can also generate a second lineage graph including a second set of monitored assets and processes that produced the data asset with the data quality issue. The processor can further compare the second lineage graph with the first lineage graph to detect a potential root cause of the data quality issue. The processor can also further modify an asset or process corresponding to the potential root cause of the data quality issue.

17 Claims, 7 Drawing Sheets

(56) References Cited

U.S. PATENT DOCUMENTS

| | | | |
|---|---|---|---|
| 9,262,493 | B1 | 2/2016 | Dietrich |
| 2003/0236677 | A1* | 12/2003 | Casati ............... G06Q 10/0633 705/7.27 |
| 2005/0027717 | A1 | 2/2005 | Koudas |
| 2005/0076313 | A1 | 4/2005 | Pegram |
| 2005/0187972 | A1* | 8/2005 | Kruger ................ G06Q 10/063 |
| 2005/0197773 | A1* | 9/2005 | Brewster ................ G01V 7/16 702/2 |
| 2006/0020641 | A1* | 1/2006 | Walsh .................... G06Q 10/10 |
| 2007/0086539 | A1 | 4/2007 | Hocevar |
| 2008/0208910 | A1* | 8/2008 | MacIntyre ........ G06F 17/30536 |
| 2008/0243884 | A1* | 10/2008 | Mehta ............... G06F 17/30563 |
| 2009/0063534 | A1 | 3/2009 | Halberstadt |
| 2010/0005346 | A1* | 1/2010 | Hamlescher ........... G06Q 10/06 714/57 |
| 2011/0202817 | A1 | 8/2011 | Hu |
| 2013/0297477 | A1 | 11/2013 | Overman et al. |
| 2013/0332423 | A1* | 12/2013 | Puri .................. G06F 17/30309 707/687 |
| 2014/0026002 | A1 | 1/2014 | Haines |
| 2014/0279835 | A1 | 9/2014 | Li et al. |
| 2015/0019303 | A1* | 1/2015 | Rao .................. G06Q 10/06395 705/7.41 |
| 2015/0149475 | A1 | 5/2015 | Nakahira |
| 2016/0012153 | A1 | 1/2016 | Gralnick |
| 2016/0034502 | A1* | 2/2016 | Dupey .............. G06F 17/30303 707/688 |
| 2016/0246835 | A1 | 8/2016 | Nguyen |
| 2016/0364434 | A1 | 12/2016 | Spitz et al. |
| 2017/0235848 | A1 | 8/2017 | Van Dusen |
| 2017/0351728 | A1 | 12/2017 | Halberstadt |

OTHER PUBLICATIONS

Data quality issues in visualization A Pang, J Furman, W Nuss—SPIE, Feb. 1994—proceedings.spiedigitallibrary.org.*

Multidimensional Management of Geospatial Data Quality Information for its Dynamic Use Within GIS R Devillers, Y Bédard . . .—. . . & Remote Sensing, 2005—pdfs.semanticscholar.org.*

Glyphs for visualizing uncertainty in vector fields CM Wittenbrink, AT Pang . . .—. . . on Visualization and . . . , 1996—ieeexplore.ieee.org.*

Techniques for precision-based visual analysis of projected data T Schreck, T Von Landesberger . . .—Information . . . , 2010—search.proquest.com.*

Quality metrics in high-dimensional data visualization: An overview and systematization E Bertini, A Tatu, D Keim—IEEE Transactions on Visualization . . . , 2011—ieeexplore.ieee.org.*

Lineage tracing for general data warehouse transformations Y Cui, J Widom—The VLDB Journal—The International Journal on Very . . . , 2003—dl.acm.org (Year: 2003).* http://blog.appliedinformaticsinc.com/etl-extract-transform-and-load-process-concept/, 2002 (Year: 2002).*

Methodologies for data quality assessment and improvement C Batini, C Cappiello, C Francalanci . . .—ACM computing surveys . . . , 2009—dl.acm.org (Year: 2009).*

A simplified approach for quality management in data warehouse V Kumar, R Thareja—arXiv preprint arXiv:1310.2066, 2013—arxiv.org (Year: 2013).*

Quality of Big Data in health care SR Sukumar, R Natarajan . . .—International journal of . . . , 2015—emeraldinsight.com (Year: 2015).*

Mell et al., "The NIST Definition of Cloud Computing", National Institute of Standards and Technology, Special Publication 800-145, Sep. 2011, pp. 1-7.

"Data Quality ETL Process", ETL Tools Info-Data Warehousing and Business Intelligence, http://etl-tools.info/en/examples/data-quality.htm, printed Jun. 1, 2016, pp. 1-5.

IBM, List of IBM Patents or Patent Applications Treated as Related, Appendix P, dated Jan. 30, 2017, 2 pages.

Pending U.S. Appl. No. 15/417,012, filed Jan. 26, 2017, entitled: "Detecting Potential Root Causes of Data Quality Issues Using Data Lineage Graphs", 35 pages.

Devillers et al., "Multidimensional Management of Geospatial Data Quality Information for its Dynamic Use Within GIS", Photogrammetric Engineering & Remote Sensing, vol. 71, No. 2, Feb. 2005, pp. 205-215.

Pang et al., "Data Quality Issues in Visualization", Calhoun: The NPS Insitutional Archive DSpace Repository, 1994, http://hdl.handle.net/10945/44293, pp. 1-13.

Kandele et al., "Profiler: Integrated Statistical Analysis and Visualization for Data Quality Assessment", AVI'12, May 21-25, 2012, Capri Island, Italy, Copyright 2012 ACM, pp. 1-8.

Schreck et al., "Techniques for Precision-Based Visual Analysis of Projected Data", https://dl.acm.org/citation.cfm?id=1991819, Information Visualization—Special issue on selected papers from visualization and data analysis 2010, vol. 9, Issue 3, Autumn 2010, pp. 1-4.

Wittenbrink et al., "Glyphs for Visualizing Uncertainty in Vector Fields", IEEE Transactions on Visualization and Computer Graphics, vol. 2, No. 3, Sep. 1996, pp. 266-279.

Golab et al., "Scheduling Updates in a Real-Time Stream Warehouse," IEEE International Conference on Data Engineering, 2009, p. 1207-1210, IEEE Computer Society.

Moyer, "Early Developments in American Auditing," The Accounting Review, Jan. 1951, p. 3-8, vol. 26, No. 1, American Accounting Association.

* cited by examiner

DETECTING POTENTIAL ROOT CAUSES OF DATA QUALITY ISSUES USING DATA LINEAGE GRAPHS

BACKGROUND

The present techniques relate to detecting root causes of data quality issues. More specifically, the techniques relate to detecting root causes of data quality issues using data lineage graphs.

BRIEF SUMMARY

According to an embodiment described herein, a system can include processor to generate a first lineage graph based on a first set of monitored assets and processes used to produce a data asset. The processor can also further detect a data quality issue at the data asset. The processor can also generate a second lineage graph including a second set of monitored assets and processes that produced the data asset with the data quality issue. The processor can further compare the second lineage graph with the first lineage graph to detect a potential root cause of the data quality issue. The processor can also further modify an asset or a process corresponding to the potential root cause of the data quality issue.

According to another embodiment described herein, a method can include monitoring, via a processor, a first set of upstream assets, processes, and a data asset generated based on the plurality of upstream assets and processes. The method can further include generating, via the processor, a first lineage graph based on the first set of monitored assets and processes. The method can also further include detecting, via the processor, a data quality issue at the data asset. The method can also include generating, via the processor, a second lineage graph including a second set of monitored assets and processes that produced the data asset with the data quality issue. The method can also further include comparing, via the processor, the second lineage graph with the first lineage graph to detect a potential root cause of the data quality issue. The method can also include modifying, via the processor, an asset or a process corresponding to the potential root cause of the data quality issue.

According to another embodiment described herein, a computer program product for modifying monitored assets or processes can include computer-readable storage medium having program code embodied therewith. The computer readable storage medium is not a transitory signal per se. The program code executable by a processor to cause the processor to monitor a first set of upstream assets, processes, and a data asset. The program code can also cause the processor to generate a first lineage graph based on the first set of monitored assets and processes. The program code can also cause the processor to detect a data quality issue at the data asset. The program code can also cause the processor to generate a second lineage graph including a second set of monitored assets and processes that produced the data asset with the data quality issue. The program code can also cause the processor to compare the second lineage graph with the first lineage graph. The program code can also cause the processor to also further detect a potential root cause of the data quality issue based on a detected difference between the second lineage graph and the first lineage graph. The program code can also cause the processor to modify an asset or a process corresponding to the potential root cause of the data quality issue.

DETAILED DESCRIPTION

Figure 1:
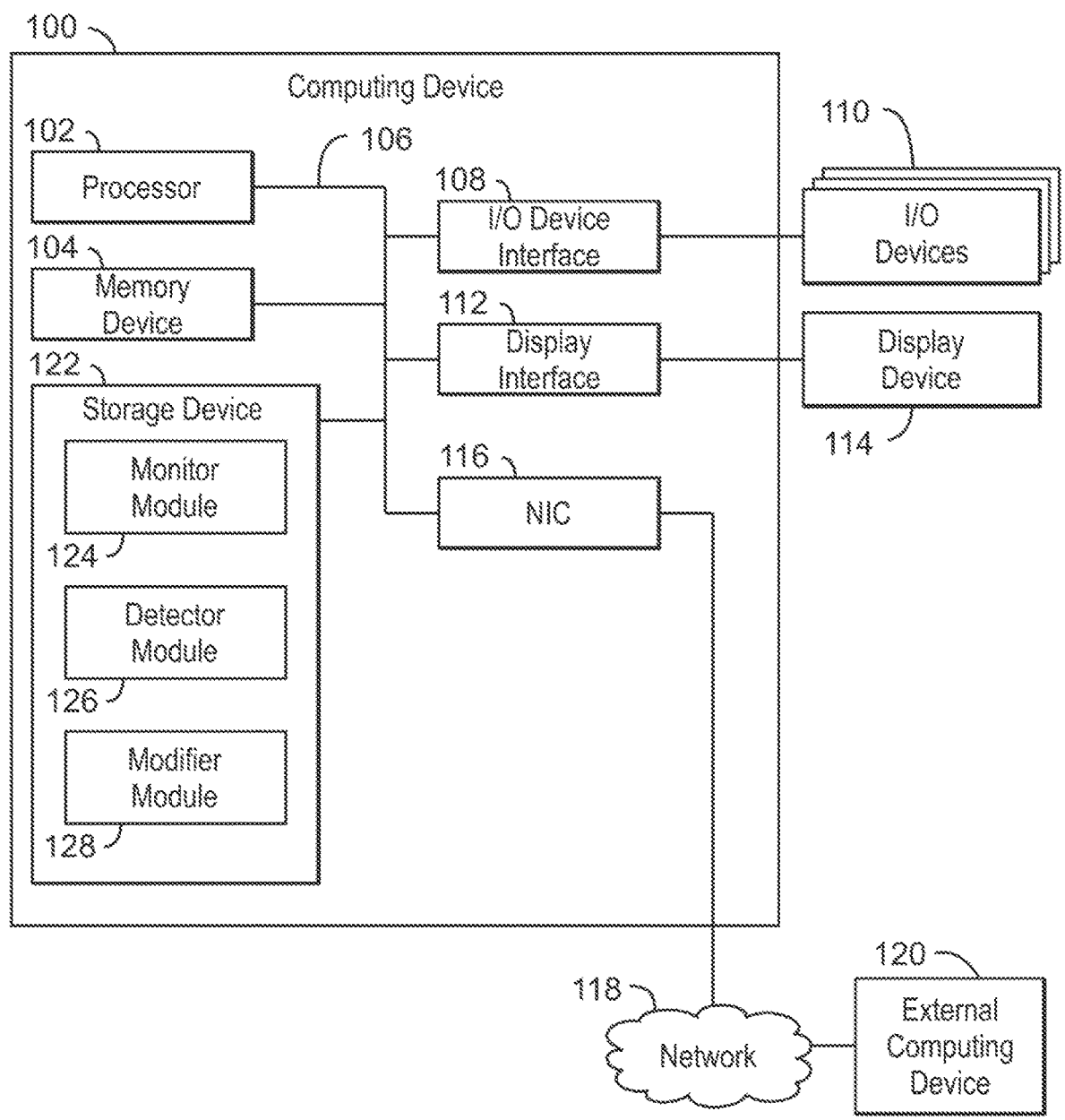
FIG. 1 is a block diagram of an example computing device that can modify data assets based on detected potential root causes of data asset quality issues.

Many enterprises today rely on data assets to run their operational systems. A data asset, as used herein, refers to processed data that exists within a context of a larger data flow. For example, one or more processes may process data from one or more upstream assets and write the processed data to the data asset. An upstream asset, as used herein, refers to any source of data, including operational systems, data warehouses, and data marts, among other suitable data sources. A data asset, as used herein, refers to a target store of processed data. The processes can aggregate information such as, check information, cleaning information, mapping information between two values, and the like. For example, the processes can include extract, transform, and load (ETL) jobs reading from operational systems and writing to a data warehouse. Another example of a process is a data lifecycle management tool reading from a warehouse to create test data stored in a data asset. A further example of a process may be reporting cubes reading from a data mart and producing multi-dimensional arrays of data for enabling data analytics. Thus, the upstream assets and the processes contribute to the data assets that they generate. In order to ensure that data assets meet particular quality standards, the data assets may be monitored using various profiling tools. When the data quality of a data asset deteriorates, the root causes of the deterioration may be found to fix the problem. In some examples, when the data quality of an asset deteriorates, profiling tools can be used to manually search for the root causes of data quality issues. Data quality issues can include, for example, malformed, missing, or truncated data, such as customer phone numbers, as addresses, or any other type of data. For example, in a previous implementation, a Chief Data Officer (CDO) may use a data quality dashboard that provides metrics and trends for operational assets. The CDO may discover that a quality of web orders has decreased relative to a previous month. For example, the format of zip codes corresponding to the web orders may no longer be compliant. The CDO may then ask an enterprise architect to search for the root cause of this issue and fix it. For example, the architect may perform the following steps: find all data assets contributing to the web orders data, understand the data within each contributing asset and how it impacts the web orders data, and identify the contributing asset that is causing the data quality issue in the web orders data. Manually identifying assets contributing to the data quality issue thus may involve detailed knowledge of all data assets, their meaning, and the way that each data asset is used. Moreover, no one person or team in an organization may have all this knowledge, including the enterprise architect. An enterprise may have large numbers of assets, thus locating and understanding the usage of each asset may be time consuming. Furthermore, due to negligence or human error, assets may be left out and incorrect root causes may be identified.

According to techniques of the present disclosure, data assets can be modified based on detected potential root causes of data asset quality issues. For example, a system can monitor a first set of upstream assets, processes, and data assets and generate a first lineage graph based on the first set of monitored assets and processes used to produce a data asset. The system can then detect a data quality issue at a data asset. For example, the data quality issue can be detected using a data quality threshold based on any suitable data quality metric. The system can then generate a second lineage graph including a second set of monitored assets and processes that produced the data asset with the data quality issue. The system can then compare the second lineage graph with the first lineage graph to detect a potential root cause of the data quality issue. For example, the potential root cause may be a modified upstream asset or process, a removed upstream asset or process, or a new upstream asset or process. The system can then modify an asset or a process corresponding to the potential root cause of the data quality issue. For example, the system can remove new upstream assets or processes, revert modified upstream assets or process to previous versions, or reintroduce upstream assets or process that may have been removed. Thus, embodiments of the present disclosure enable data assets to be modified automatically based on detected data quality issues. For example, changes made to upstream assets or processes can be reversed based on the results of the comparison. Thus, modifications to an upstream asset or process that result in data quality issues can be automatically fixed using techniques described herein. Moreover, the techniques do not rely on the knowledge of a variety of experts to determine the root cause of data quality issues. In addition, the time and resources used to locate contributing assets can be reduced. Furthermore, automated determination according to techniques herein can reduce errors in both assets being left out of consideration and incorrect causes being identified.

In some scenarios, the techniques described herein may be implemented in a cloud computing environment. As discussed in more detail below in reference to at least FIGS. 1, 4, and 5, a computing device configured to modify assets or processes based on detected potential root causes of data asset quality issues. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, an example computing device can modify data assets based on detected potential root causes of data asset quality issues. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external web-server 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a monitor module 124, a detector module 126, and a modifier module 128. The monitor module 124 can generate a first lineage graph based on a first set of monitored assets and processes used to produce a data asset. For example, the assets may be upstream assets. The detector module 126 can detect a data quality issue at the data asset. For example, the detector module 126 can detect the data quality issue based on a data quality threshold. In some examples, the data quality threshold can be based on any suitable data quality metric. The monitor module 124 can generate a second lineage graph including a second set of monitored assets and processes that produced the data asset with the data quality issue. The detector module 126 can compare the second lineage graph with the first lineage graph to detect a potential root cause of the data quality issue. In some examples, the detector module 126 can display the potential root cause of the data quality issue. For example, the potential root cause may be a modified asset or a modified process in the second lineage graph. In some examples, the potential root cause may be a missing asset or a missing process in the second lineage graph. In some examples, the potential root cause may be a new asset or a new process in the second lineage graph. The modifier module 128 can modify an asset or a process corresponding to the potential root cause of the data quality issue. For example, if the detected potential root cause is a modified asset or process, then the modifier module 128 can modify the modified asset or process back to its state in the first lineage graph. In some examples, if the detected potential root cause is a removed asset or process, then the modifier module 128 can reintroduce the removed asset or process. In some examples, if the detected potential root cause is a new asset or process, then the modifier module 128 can remove the new asset or process, or otherwise modify the new asset or process to improve data asset quality.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the monitor module 124, the detector module 126, and the modifier module 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the monitor module 124, detector module 126, and modifier module 128 can be implemented with logic, wherein the logic, as referred to herein, can include any suitable hardware (e.g., a processor, among others), software (e.g., an application, among others), firmware, or any suitable combination of hardware, software, and firmware.

Figure 2A:
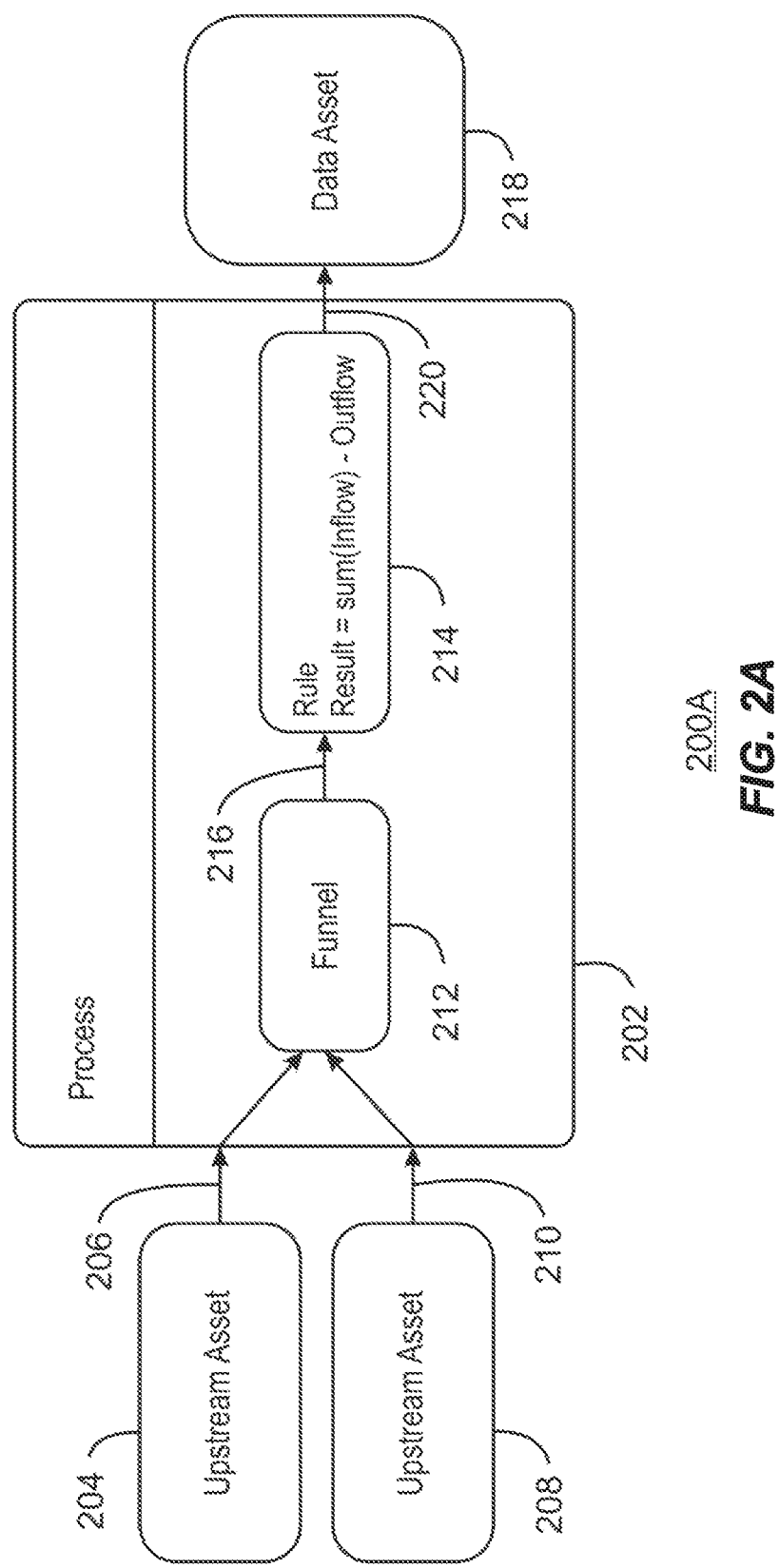
FIG. 2A is a block diagram of an example data lineage graph of a data asset process.

FIG. 2A is a block diagram of an example data lineage graph of a data asset process. The example lineage graph is generally referred to by the reference number 200A.

The example lineage graph 200A of FIG. 2A includes a process 202 receiving a first upstream asset 204 as indicated by an arrow 206 and a second upstream asset 208 as indicated by an arrow 210. The upstream assets 204, 208 are shown being input into a funneling stage 212 of the process 202. A second stage 214 of the process 202 is shown receiving the funneled information as indicated by an arrow 216. The second stage may apply one or more rules to the funneled information. A data asset 218 is shown being generated by the process 202 as indicated by an arrow 220.

In the example of FIG. 2A, the process 202 is reading information from two upstream assets 204, 208 and writing processed data to the data asset 218. For example, the upstream assets 204, 208 may be two tables or any other suitable source of information. The funneling stage 212 takes information from the two upstream assets 204, 208 and merges the information into one set of information. For example, the information may be merged into one table. In some examples, a column called inflow and another column called outflow may be formed. In some embodiments, the inflow column and the outflow column can correspond to separate upstream assets 204. At the second stage 214 a new column called result may be generated and the values of the new column can be propagated based on the rule Result=sum(inflow)—outflow. The resulting table with three columns may be output as indicated by arrow 220 to the data asset 218. In some embodiments, the second stage 214 can be the result of combining two upstream assets as one column. In some examples, the second stage 214 can store the result of combining two upstream assets in any suitable data structure such as a vector, a linked list, an array, and the like.

It is to be understood that the block diagram of FIG. 2A is not intended to indicate that the example lineage graph 200A is to include all of the components shown in FIG. 2A. Rather, the lineage graph 200A can include fewer or additional components not illustrated in FIG. 2A (e.g., additional upstream assets, processes, stages, additional rules, data assets, etc.). Furthermore, the lineage graph 200A is just one example, and any suitable type of directed graph could be used with the present techniques.

Figure 2B:
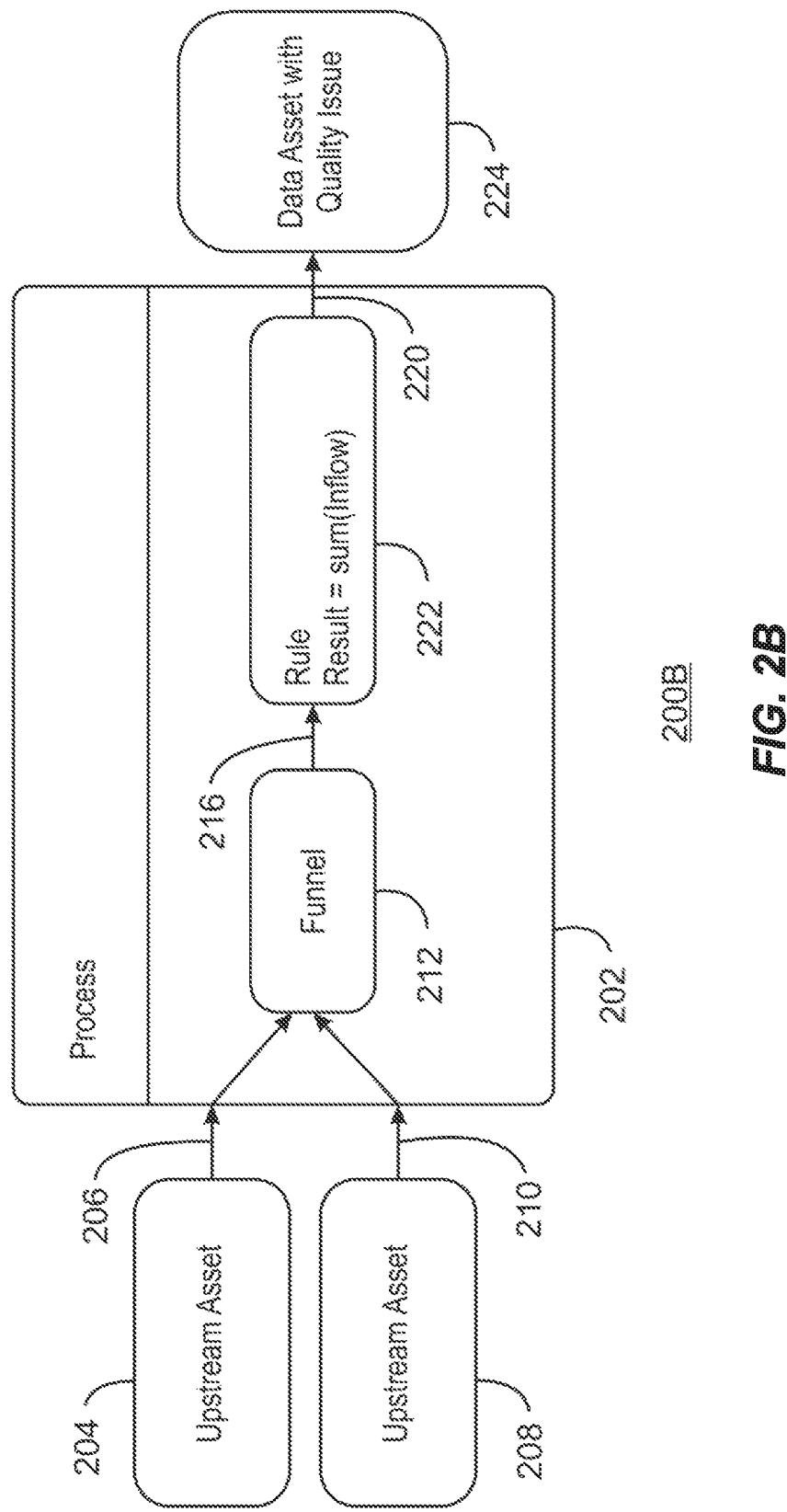
FIG. 2B is a block diagram of an example data lineage graph of a data asset process with a detected data asset quality issue.

FIG. 2B is a block diagram of an example data lineage graph of a data asset process with a detected data asset quality issue. The example lineage graph is generally referred to by the reference number 200B.

The example lineage graph 200B includes the upstream assets 204, 208 and funneling stage 212 of above, but shows a second stage 222 that differs from the second stage of FIG. 2A. The second stage 222 is also shown generating a data asset 224 with a quality issue.

In the example of FIG. 2B, the second stage now includes a rule where Result=sum(inflow). Thus, the rule may have been edited from the original rule in the stage 214 of FIG. 2A. The profit column of the processed data may now be calculated using this new rule and sent to the data asset 224. In this example, the data asset 224 exhibits a data quality issue. Therefore, the data quality issue may be attributed to the change in the rule at the second stage 222. The rule change in the second stage 222 may thus be referred to as a potential root cause of the data quality issue. In some examples, the second stage 222 may be reverted back to the second stage 214 to include the rule Result=sum(inflow)-outflow as described in greater detail with respect to FIG. 3 below.

It is to be understood that the block diagram of FIG. 2B is not intended to indicate that the example lineage graph 200B is to include all of the components shown in FIG. 2B. Rather, the lineage graph 200B can include fewer or additional components not illustrated in FIG. 2B (e.g., additional upstream assets, processes, stages, additional rules, data assets, etc.). Furthermore, the lineage graph 200B is just one example, and any suitable type of directed graph could be used with the present techniques.

Figure 3:
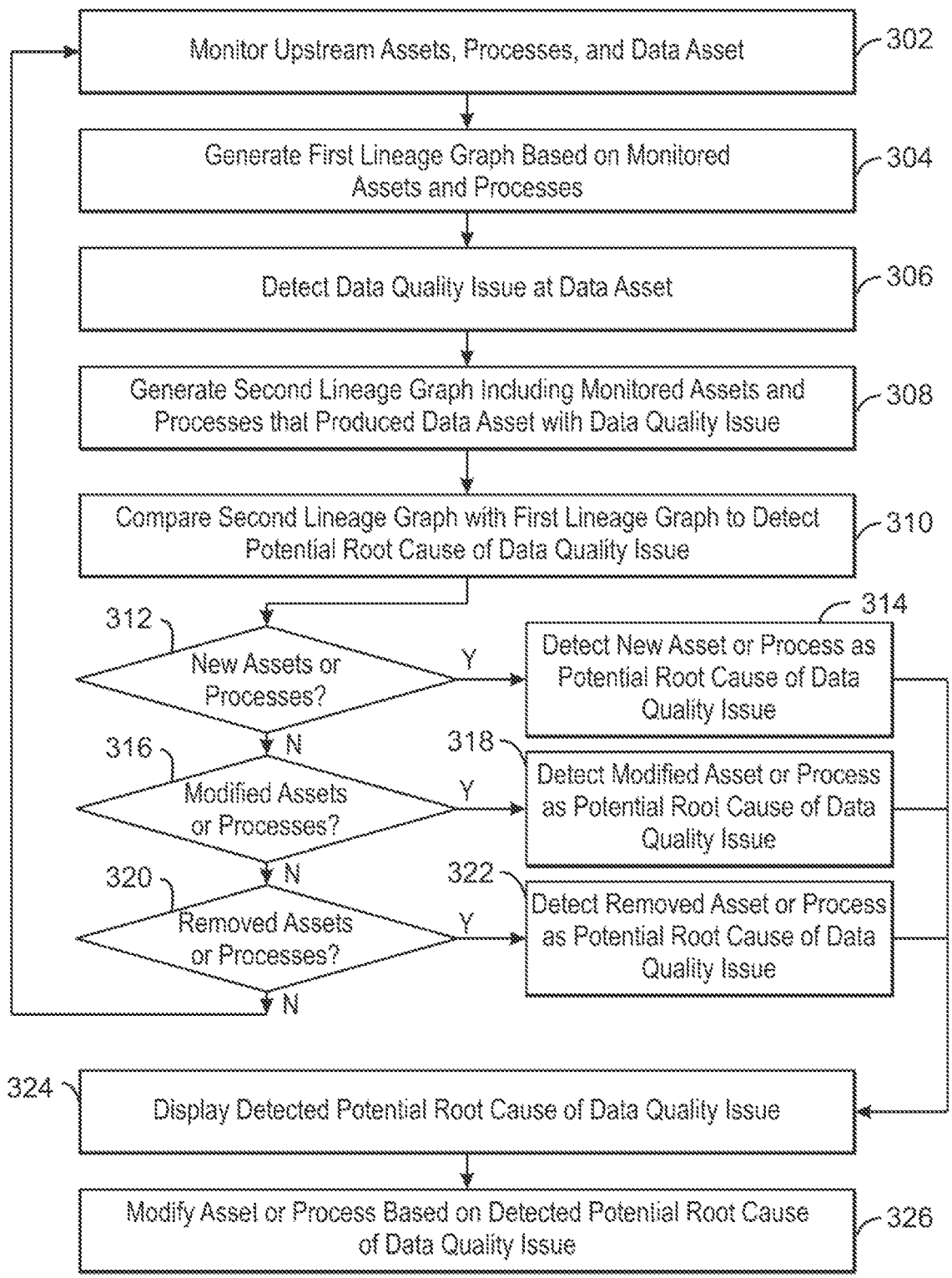
FIG. 3 is a process flow diagram of an example method for modifying data assets based on detected potential root causes of data asset quality issues.

FIG. 3 is a process flow diagram of an example method for modifying data assets based on detected potential root causes of data asset quality issues. The method 300 can be implemented with any suitable computing device, such as the computing device 100 of FIG. 1.

At block 302, the computing device monitors upstream assets, processes, and a data asset. For example, a number of upstream assets and processes corresponding to one or more key data assets may be monitored.

At block 304, the computing device generates a first lineage graph based on the plurality of monitored assets and processes. For example, the computing device may use a data lineage analysis tool to generate data lineage graphs. For example, the first lineage graph may include a plurality of monitored assets and processes that do not cause any data quality issues in the data asset. In some examples, data lineage graphs can be periodically generated for key data assets. These data lineage graphs can then be stored for future use and analysis. The computing device can thus capture processes and upstream assets that are involved in data movement processes.

At block 306, the computing device detects a data quality issue at the data asset. For example, the data quality issue can be detected based on a data quality threshold. In some examples, the data quality threshold can be based on any suitable data quality metric. Suitable data quality metrics can be based on rules indicating what a column may or may not contain. For example, an example data quality metric may determine the number of rows having data quality issues based on the rules that a "phone number" column may not contain null values, an "age" column may contain values between 18-55, a "gender" column may contain values [M, F, NULL], among other possible rules.

At block 308, the computing device generates a second lineage graph including the plurality of monitored assets and processes that produced the data asset with the data quality issue. For example, the second lineage graph can be generated in response to detecting the data quality issue at the data asset.

At block 310, the computing device compares the second lineage graph with the first lineage graph to detect a potential root cause of the data quality issue. In some examples, the graphs can be traversed and their nodes compared until a difference is detected. For example, the graphs may be directed graphs. In some examples, each graph may contain nodes with attributes. For example, the attributes can be used to check for differences between the nodes.

At block 312, the computing device determines whether the second lineage graph has new assets or processes in comparison with the first lineage graph. For example, the computing device may determine whether the second lineage graph has a new asset based on detected new nodes in a directed graph. In some examples, the computing device may determine whether the second lineage graph has a new process based on a detected new edge in a directed graph. If the computing device detects that the second lineage graph contains new assets or processes, then the method may proceed at block 314. If the computing device does not detect any new assets or processes, then the method may proceed at block 316.

At block 314, the computing device detects that a new asset or process is the potential root cause of the data quality issue. For example, the computing device may detect that the new asset or process is the potential root cause of the data quality issue based on the new asset or process being detected in the second lineage graph that exhibits data quality issues after the data quality issues are detected. For example, a new database may be contributing to the data asset exhibiting the data quality issue. In some examples, a transformation in an ETL process may have been changed. In some examples, a new database may have been read by an ETL processing.

At block 316, the computing device determines whether the second lineage graph has modified assets or processes in comparison with the first lineage graph. For example, the computing device can determine that a second lineage graph has a modified asset based on changed attributes between detected nodes in the two graphs. For example, a node representing a column may have attributes such as name, datatype, size, etc. In some examples, one or more of these attributes may have different values indicating a modified asset. The computing device can determine that a second lineage graph has a modified process based on changed attributes between detected nodes in the graph. For example, one or more edges may have attributes with values that may have changed. If the computing device detects that the second lineage graph contains modified assets or processes, then the method may proceed at block 318. If the computing device does not detect any modified assets or processes, then the method may proceed at block 320.

At block 318, the computing device detects that a modified asset or process is a potential root cause of the data quality issue. In some examples, the computing device can detect a modified asset or modified process is a potential root cause based on the modified asset or modified process being the detected after the data quality issue is detected. For example, an ETL process may have had a transformation logic modified. In some examples, a column may have had its datatype changed.

At block 320, the computing device determines whether the second lineage graph has removed assets or processes in comparison with the first lineage graph. If the computing device detects that the second lineage graph has removed assets or processes, then the method may proceed at block 322. If the computing device does not detect any new assets or processes, then the method may proceed back to block 302.

At block 322, the computing device detects that a removed asset or process is a root cause of the data quality issue. For example, a standardization process may have been operating previously to produce the data asset, but may not be operating any longer. In some examples, a column may have been dropped from a database.

At block 324, the computing device displays the potential root cause of the data quality issue. For example, computing device may display the potential root cause for a user to select and manually modify accordingly.

At block 326, the computing device modifies an asset or process based on the detected potential root cause of the data quality issue. For example, the computing device may remove the asset or the process in response to detecting that the asset or process is new in the second lineage graph. For example, if we remove an asset or process, the data quality issue may be resolved. In some examples, the computing device may reintroduce the asset or the process in response to detecting that the asset or process is removed in the second lineage graph. In some examples, the computing device can revert the asset or the process to a previous state of the asset or process in the first lineage graph in response to detecting that the asset or process is modified in the second lineage graph. In some examples, the computing device can verify the potential root cause is an actual root cause by detecting that the data quality issue is not present after modifying the asset or the process. In some examples, two potential root causes may be detected to upstream data assets, but in reality one modification may be the actual root cause. Therefore, the computing device may modify the asset or process based on each detected potential root cause and detect whether each potential root cause is an actual root cause. For example, if the data quality issue threshold is no longer exceeded, then the data quality issue can be detected as resolved. In some examples, the modified potential root cause may then be determined to be an actual root cause.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
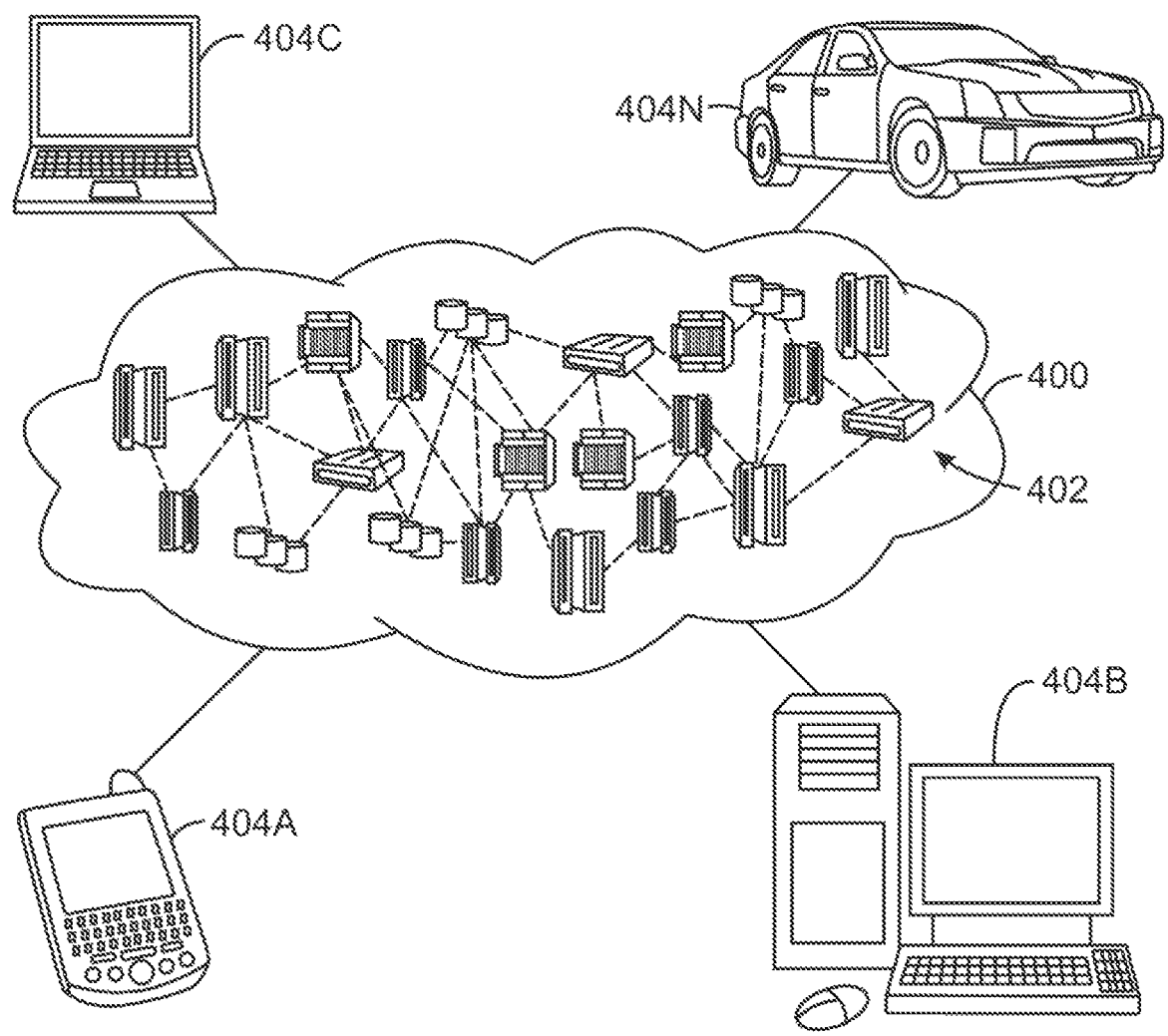
FIG. 4 is a block diagram of an example cloud computing environment according to embodiments described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
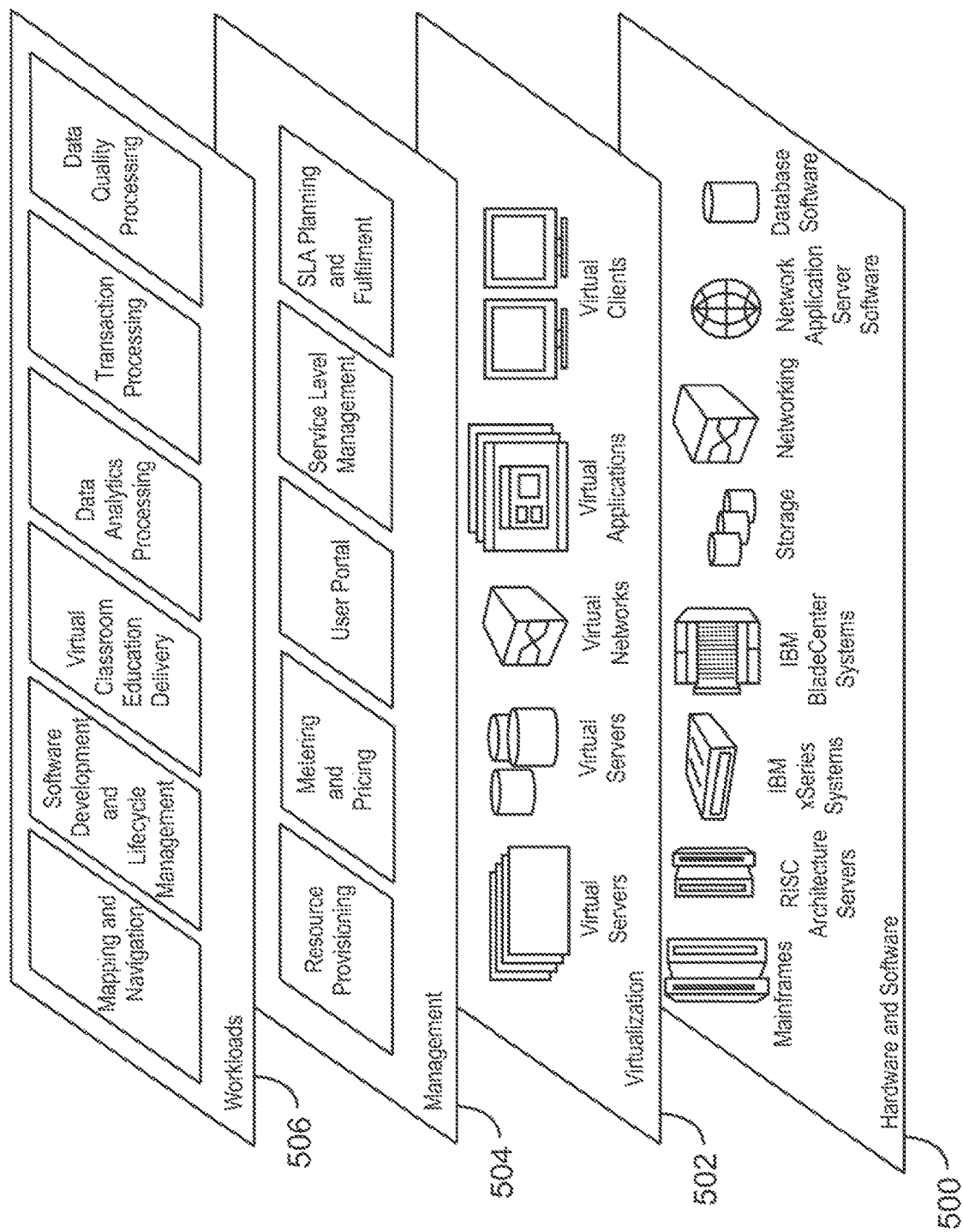
FIG. 5 is an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data quality processing.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
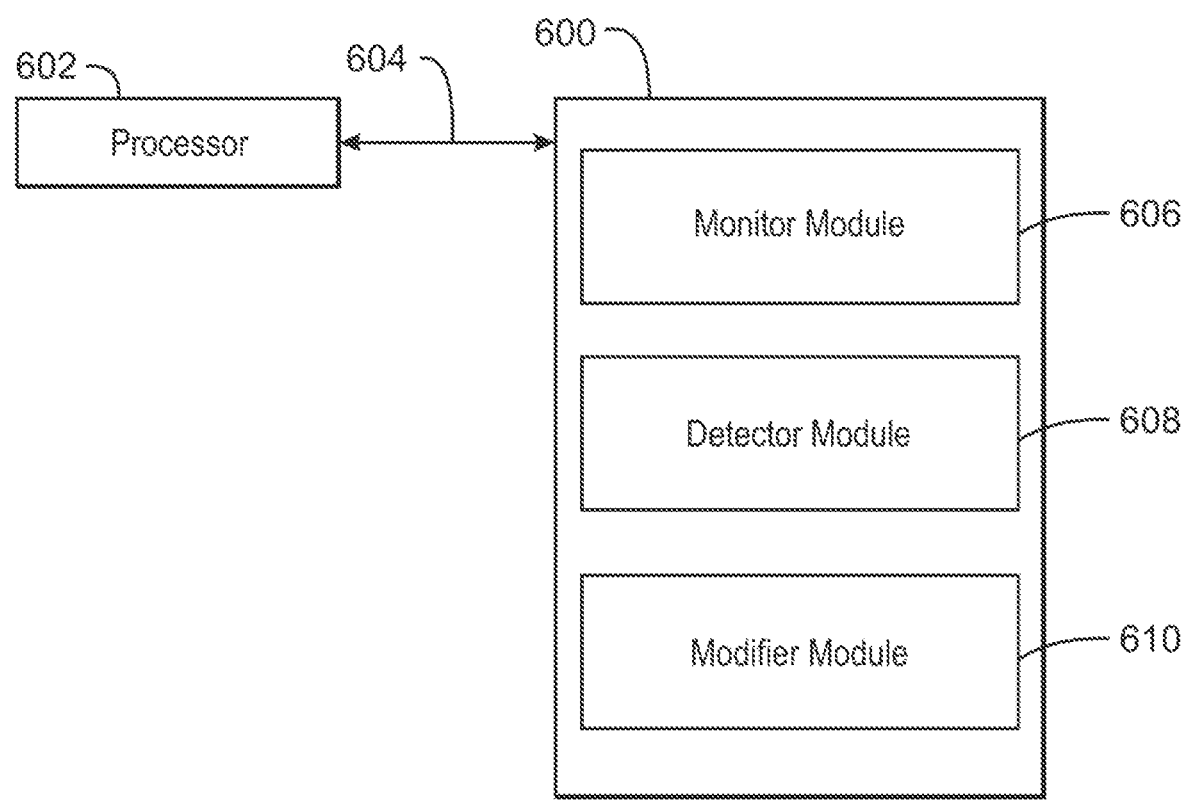
FIG. 6 is an example tangible, non-transitory computer-readable medium that can modify assets or processes based on detected potential root causes of data asset quality issues.

Referring now to FIG. 6, a block diagram is depicted of an example tangible, non-transitory computer-readable medium 600 that can modify assets or processes based on detected potential root causes of data asset quality issues. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 300 of FIG. 3 above.

The various software components discussed herein may be stored on the tangible, non-transitory, computer-readable medium 600, as indicated in FIG. 6. For example, a monitor module 606 includes code to monitor a first set of upstream assets, processes, and a data asset. A detector module 608 includes code to generate a first lineage graph based on the first set of monitored assets and processes. The detector module 608 includes code to detect a data quality issue at the data asset. The monitor module 606 further includes code to generate a second lineage graph including a second set of monitored assets and processes that produced the data asset with the data quality issue. The detector module 608 further includes code to compare the second lineage graph with the first lineage graph. The detector module 608 also further includes code to detect a potential root cause of the data quality issue based on a detected difference between the second lineage graph and the first lineage graph. For example, the detector module 608 can include code to detect a new asset or process in the second lineage graph. In some examples, the detector module 608 can include code to detect a modified asset or process in the second lineage graph. In some examples, the detector module 608 can include code to detect a missing asset or process in the second lineage graph. In some examples, the detector module 608 includes code to display the detected potential root cause of the data quality issue. A modifier module 610 includes code to modify an asset or a process corresponding to the root cause of the data quality issue. For example, the modifier module 610 can include code to remove a detected new asset or process. In some examples, the modifier module 610 can include code to reintroduce a detected removed asset or process. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
one or more computer processors, one or more computer-readable storage media, and program instructions stored on one or more of the computer-readable storage media executable by at least one of the one or more processors to cause the computer system to perform a method comprising:
monitoring, via a processor, a first set of upstream assets, processes, and a data asset generated based on the first set of upstream assets and processes, wherein a plurality of upstream assets and processes corresponding to one or more key data assets are monitored;
generating, via the processor, a first lineage graph based on the first set of monitored assets and processes with an absence of a data quality issue, the first lineage graph describing a first flow in using the processes of the first set on the monitored assets of the first set in generating the data asset, wherein one or more data lineage analysis tool generates the first lineage graph and a second lineage graph, wherein the first lineage graph and the second lineage graph are periodically generated for one or more key data assets;
detecting, via the processor, the data quality issue at the data asset, wherein a data quality threshold is utilized to detect the detected data quality issue, wherein the data quality threshold is based on at least one data quality metric, wherein the at least one data quality metric is based on a plurality of rules associated with the first lineage graph and the second lineage graph;
generating, via the processor, the second lineage graph comprising a second set of monitored assets and processes that produced the data asset with the data quality issue, the second graph describing a second flow in using the processes of the second set on the monitored assets of the second set in generating the data asset, wherein a new database contributes to the data asset with the data quality issue, wherein the new database is read by a processing of one or more extract, transform and load (ETL) jobs;
comparing, via the processor, the second lineage graph with the first lineage graph to detect a potential root cause of the data quality issue, wherein the second flow of the compared second lineage graph and the first flow of the compared first lineage graph are traversed and a plurality of nodes and a plurality of attributes associated with the compared second lineage graph and the compared first lineage graph are compared at corresponding portions along the first and second flows, wherein a detected difference between the plurality of attributes determines a modified asset;

modifying an asset or a process based on the detected potential root cause of the data quality issue, wherein the detected potential root cause of the data quality issue includes the modified asset, a modified process, a removed asset, or a removed process, wherein the modified asset, the modified process, the removed asset or the removed process is determined to be the actual root cause of the data quality issue, wherein the actual root cause of the data quality issue is displayed, via a computing device, wherein the actual root cause of the data quality issue is selected and manually modified by a user;

verifying the absence of the detected potential root cause, wherein detecting the data quality issue is absent after the asset or process is modified; and storing the compared second lineage graph and the compared first lineage graph.

2. The computer system of claim 1, wherein processor displays the potential root cause of the data quality issue.

3. The computer system of claim 1, wherein the first set of monitored assets and the second set of monitored assets comprise upstream assets.

4. The computer system of claim 1, wherein the potential root cause comprises, in the second lineage graph, one of a modified asset or a modified process.

5. The computer system of claim 1, wherein the potential root cause comprises, in the second lineage graph, one of a missing asset or a missing process.

6. The computer system of claim 1, wherein the potential root cause comprises, in the second lineage graph, one of a new asset or a new process.

7. A computer-implemented method, comprising:

monitoring, by a processor, a first set of upstream assets, processes, and a data asset generated based on the first set of upstream assets and processes, wherein a plurality of upstream assets and processes corresponding to one or more key data assets are monitored;

generating, by the processor, a first lineage graph based on the first set of monitored assets and processes with an absence of a data quality issue, the first lineage graph describing a first flow in using the processes of the first set on the monitored assets of the first set in generating the data asset, wherein one or more data lineage analysis tool generates the first lineage graph and a second lineage graph, wherein the first lineage graph and the second lineage graph are periodically generated for one or more key data assets;

detecting, by the processor, the data quality issue at the data asset, wherein a data quality threshold is utilized to detect the detected data quality issue, wherein the data quality threshold is based on at least one data quality metric, wherein the at least one data quality metric is based on a plurality of rules associated with the first lineage graph and the second lineage graph;

generating, by the processor, the second lineage graph comprising a second set of monitored assets and processes that produced the data asset with the data quality issue, the second graph describing a second flow in using the processes of the second set on the monitored assets of the second set in generating the data asset, wherein a new database contributes to the data asset with the data quality issue, wherein the new database is read by a processing of one or more extract, transform and load (ETL) jobs;

comparing, by the processor, the second lineage graph with the first lineage graph to detect a potential root cause of the data quality issue, wherein the second flow of the compared second lineage graph and the first flow of the compared first lineage graph are traversed and a plurality of nodes and a plurality of attributes associated with the compared second lineage graph and the compared first lineage graph are compared at corresponding portions along the first and second flows, wherein a detected difference between the plurality of attributes determines a modified asset;

modifying an asset or a process based on the detected potential root cause of the data quality issue, wherein the detected potential root cause of the data quality issue includes the modified asset, a modified process, a removed asset, or a removed process, wherein the modified asset, the modified process, the removed asset or the removed process is determined to be the actual root cause of the data quality issue, wherein the actual root cause of the data quality issue is displayed, via a computing device, wherein the actual root cause of the data quality issue is selected and manually modified by a user;

verifying the absence of the detected potential root cause, wherein detecting the data quality issue is absent after the asset or process is modified; and storing the compared second lineage graph and the compared first lineage graph.

8. The computer-implemented method of claim 7, further comprising detecting that a new asset or process is the potential root cause of the data quality issue based on detecting the new asset or process in the second lineage graph.

9. The computer-implemented method of claim 7, further comprising detecting that a modified asset or process is the potential root cause of the data quality issue based on detecting the modified asset or process in the second lineage graph.

10. The computer-implemented method of claim 7, further comprising detecting that a removed asset or process is the potential root cause of the data quality issue based on detecting the removed asset or process in the second lineage graph.

11. The computer-implemented method of claim 7, wherein modifying, via the processor, the asset or the process corresponding to the potential root cause of the data quality issue comprises removing the asset or the process in response to detecting that the asset or process is new in the second lineage graph.

12. The computer-implemented method of claim 7, wherein modifying, via the processor, the asset or the process corresponding to the potential root cause of the data quality issue comprises reintroducing the asset or the process in response to detecting that the asset or process is removed in the second lineage graph.

13. A computer program product for modifying monitored assets or processes, the computer program product comprising a computer-readable storage medium having program code embodied therewith, wherein the computer readable storage medium is not a transitory signal per se, the program code executable by a processor to cause the processor to:

monitor a first set of upstream assets, processes, and a data asset produced from the first set of upstream assets and processes, wherein a plurality of upstream assets and processes corresponding to one or more key data assets are monitored;

generate a first lineage graph based on the first set of monitored assets and processes with an absence of a data quality issue, the first lineage graph describing a first flow in using the processes of the first set on the monitored assets of the first set in generating the data asset, wherein one or more data lineage analysis tool generates the first lineage graph and a second lineage graph, wherein the first lineage graph and the second lineage graph are periodically generated for one or more key data assets;

detect the data quality issue at the data asset, wherein a data quality threshold is utilized to detect the detected data quality issue, wherein the data quality threshold is based on at least one data quality metric, wherein the at least one data quality metric is based on a plurality of rules associated with the first lineage graph and the second lineage graph;

generate the second lineage graph comprising a second set of monitored assets and processes that produced the data asset with the data quality issue, the second graph describing a second flow in using the processes of the second set on the monitored assets of the second set in generating the data asset, wherein a new database contributes to the data asset with the data quality issue, wherein the new database is read by a processing of one or more extract, transform and load (ETL) jobs;

compare the second lineage graph with the first lineage graph to detect a potential root cause of the data quality issue, wherein the second flow of the compared second lineage graph and the first flow of the compared first lineage graph are traversed and a plurality of nodes and a plurality of attributes associated with the compared second lineage graph and the compared first lineage graph are compared at corresponding portions along the first and second flows, wherein a detected difference between the plurality of attributes determines a modified asset;

modify an asset or a process based on the detected potential root cause of the data quality issue, wherein the detected potential root cause of the data quality issue includes the modified asset, a modified process, a removed asset, or a removed process, wherein the modified asset, the modified process, the removed asset or the removed process is determined to be the actual root cause of the data quality issue, wherein the actual root cause of the data quality issue is displayed, via a computing device, wherein the actual root cause of the data quality issue is selected and manually modified by a user;

verify the absence of the detected potential root cause, wherein detecting the data quality issue is absent after the asset or process is modified; and store the compared second lineage graph and the compared first lineage graph.

14. The computer program product of claim 13, further comprising program code executable by the processor to detect a new asset or process in the second lineage graph.

15. The computer program product of claim 13, further comprising program code executable by the processor to detect a modified asset or process in the second lineage graph.

16. The computer program product of claim 13, further comprising program code executable by the processor to detect a missing asset or process in the second lineage graph.

17. The computer program product of claim 13, further comprising program code executable by the processor to remove a detected new asset or process or reintroduce a detected removed asset or process.

* * * * *